(12) United States Patent
Fukuhara (10) Patent No.: US 8,671,750 B2
(45) Date of Patent: Mar. 18, 2014

(54) CONTACTLESS LIQUID LEVEL SENSOR

(75) Inventor: Toshiaki Fukuhara, Shimada (JP)

(73) Assignee: Yazaki Corporation, Tokyo (JP)

( * ) Notice: Subject to any disclaimer, the term of this patent is extended or adjusted under 35 U.S.C. 154(b) by 447 days.

(21) Appl. No.: 12/988,166

(22) PCT Filed: Apr. 14, 2009

(86) PCT No.: PCT/JP2009/057813
§ 371 (c)(1),
(2), (4) Date: Oct. 15, 2010

(87) PCT Pub. No.: WO2009/128552
PCT Pub. Date: Oct. 22, 2009

(65) Prior Publication Data
US 2011/0036165 A1    Feb. 17, 2011

(30) Foreign Application Priority Data

Apr. 16, 2008    (JP) ................................. 2008-106860

(51) Int. Cl.
*G01F 23/30*    (2006.01)

(52) U.S. Cl.
USPC ......................................................... 73/314

(58) Field of Classification Search
USPC .............. 73/317, 313, 314; 116/229; 340/625
See application file for complete search history.

(56) References Cited

U.S. PATENT DOCUMENTS

| | | | |
|---|---|---|---|
| 6,497,145 B1 * | 12/2002 | Ross, Jr. ........................... | 73/305 |
| 7,703,322 B2 * | 4/2010 | Yasuda et al. .................... | 73/313 |
| 2006/0272405 A1 | 12/2006 | Feher et al. | |

FOREIGN PATENT DOCUMENTS

| | | |
|---|---|---|
| JP | 514744 U | 2/1993 |
| JP | 8234561 A | 9/1996 |
| JP | 2002-013968 A | 1/2002 |
| JP | 2004-037196 A | 2/2004 |
| JP | 3898913 B2 | 3/2007 |
| JP | 3907185 B2 | 4/2007 |
| JP | 3975966 B2 | 9/2007 |
| JP | 2008-039613 A | 2/2008 |

OTHER PUBLICATIONS

International Search Report (PCT/ISA/210) issued in PCT/JP2009/057813, dated Jul. 21, 2009.
Communication dated Sep. 4, 2012 from the Japanese Patent Office in counterpart Japanese application No. 2008-106860.

* cited by examiner

*Primary Examiner* — Peter J Macchiarolo
*Assistant Examiner* — Tamiko Bellamy
(74) *Attorney, Agent, or Firm* — Sughrue Mion, PLLC (57) ABSTRACT

The present invention is to prevent a drop in the detection accuracy caused by wear of the central shaft of a frame where a magnet holder and the magnet are fitted to each other in the course of prolonged use. A contactless liquid level sensor includes: a magnet holder which includes a resin holder body having an inner circumferential surface for defining a fitting hole and a magnet accommodated inside the holder body along the inner circumferential surface; a resin frame including a frame body, a central shaft protruding from the frame body, and a magnetic-electric converter accommodated inside the central shaft; a float arm including one end fixed to the magnet holder and the other end attached to a float vertically moving in accordance with a liquid level; and a metallic rotary support including a hollow cylindrical part arranged between the inner circumferential surface of the holder body and an outer circumferential surface of the central shaft. When the magnet holder rotates about the central shaft in accordance with the liquid level, a magnetic flux density passing through the magnetic-electric converter is varied thereby detecting a variation in the liquid level.

3 Claims, 7 Drawing Sheets

CONTACTLESS LIQUID LEVEL SENSOR

TECHNICAL FIELD

The present invention relates to a contactless liquid level sensor, and in particular, to a contactless liquid level sensor that prevents a drop in the detection accuracy caused by wear of a slid parts in a contactless liquid level sensor in order to enhance the durability.

BACKGROUND ART

Figure 5:
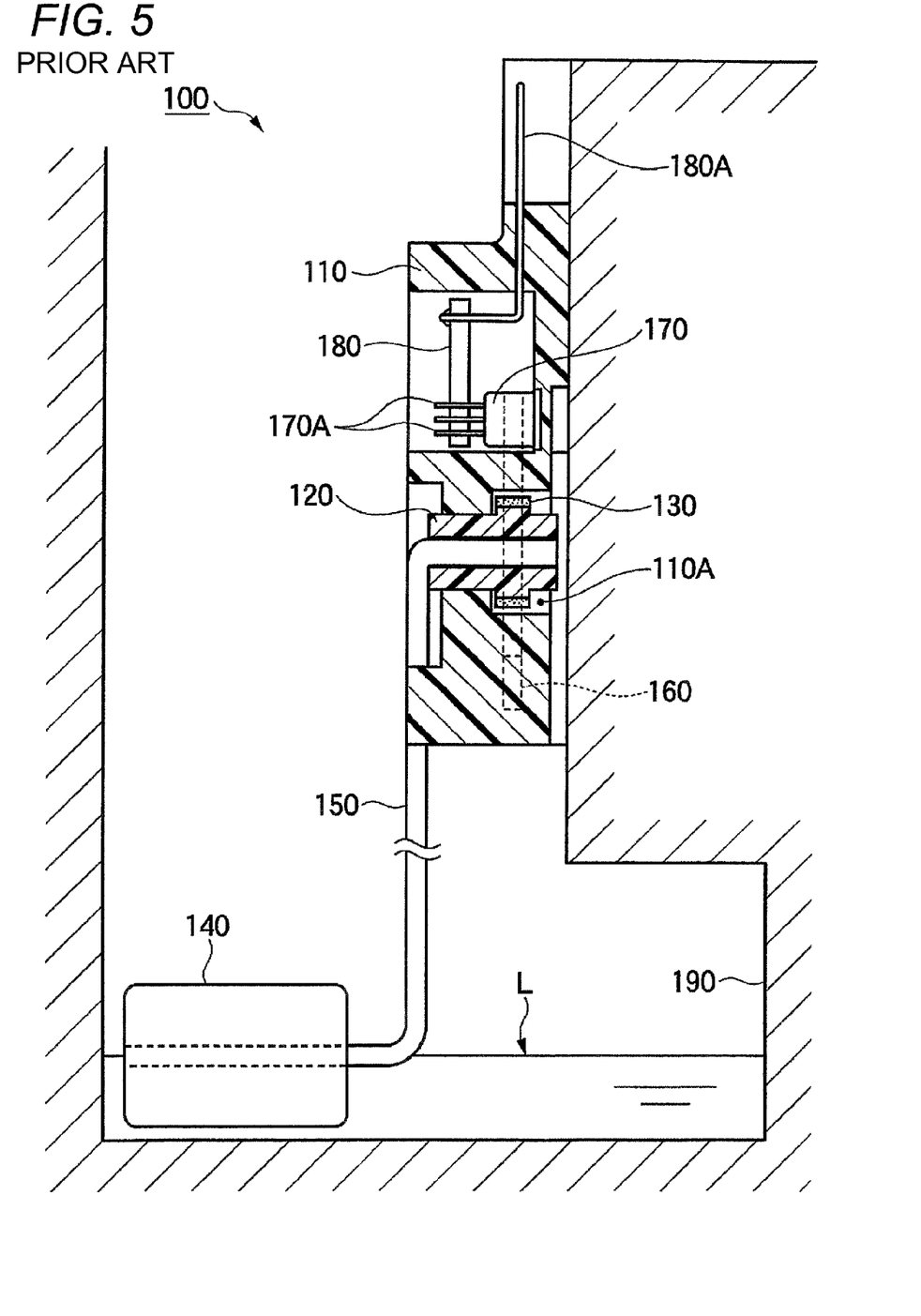
FIG. 5 is a vertical cross-sectional view of a known contactless liquid level sensor.
Figure 6:
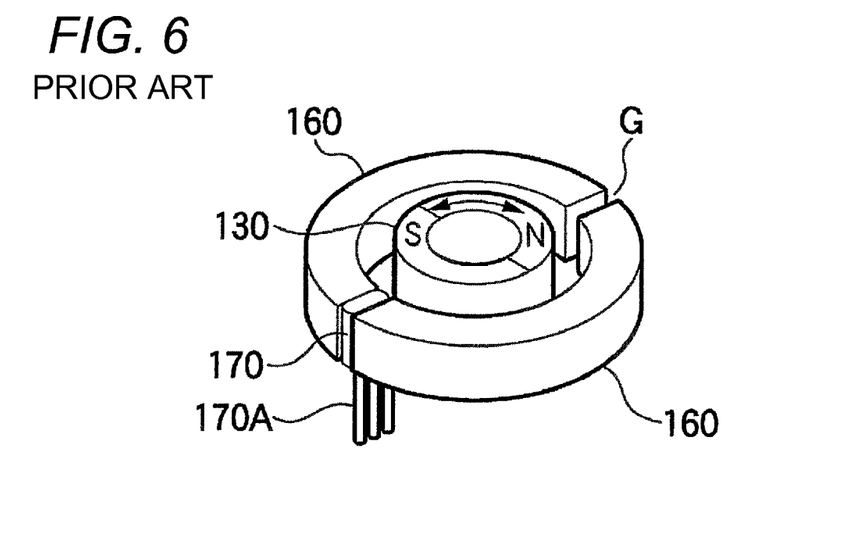
FIG. 6 is a perspective view showing the positional relation between a magnetic-electric conversion element, a magnet and a stator extracted from the contactless liquid level sensor shown in FIG. 5.
Figure 7:
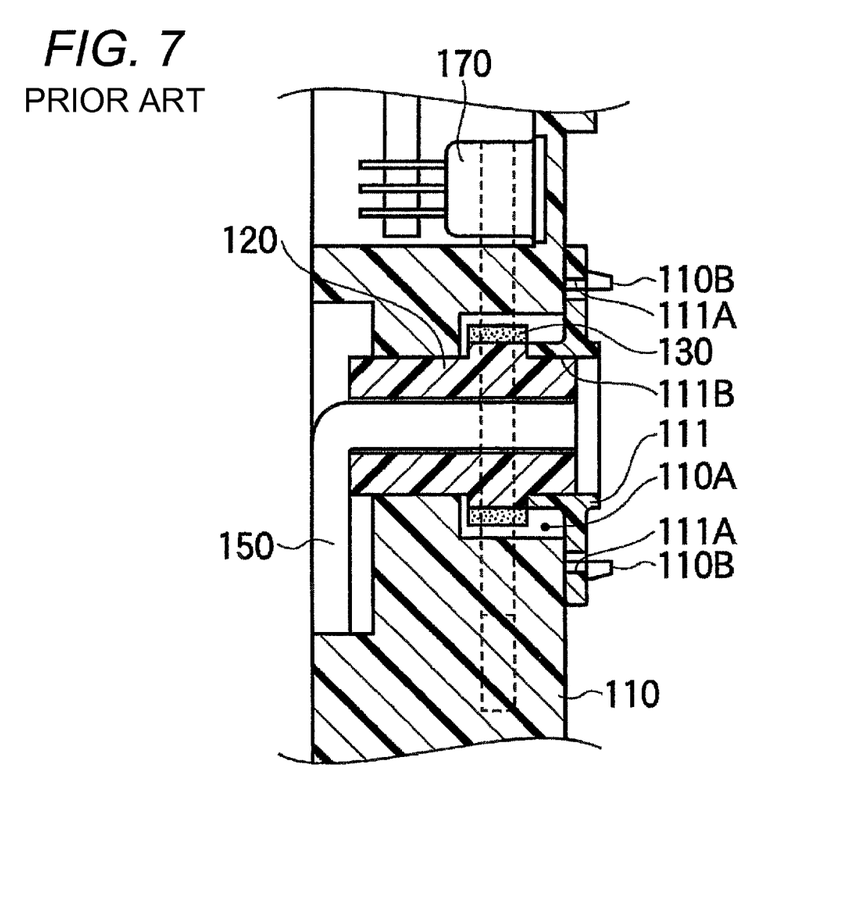
FIG. 7 is a an enlarged vertical cross-sectional view of a key section showing a related art contactless liquid level sensor where a magnet chamber cover is attached to a magnet chamber.

An example of a known contactless liquid level sensor (for example, Patent Reference 1) will be described. FIG. 5 is a vertical cross-sectional view of a known contactless liquid level sensor. FIG. 6 is a perspective view showing the positional relation between a magnetic-electric conversion element, a magnet and a stator extracted from the contactless liquid level sensor shown in FIG. 5. FIG. 7 is an enlarged vertical cross-sectional view of a key point showing a known contactless liquid level sensor where a magnet chamber cover is attached to a magnet chamber.

As shown in FIG. 5, a known contactless liquid level sensor 100 is arranged so that a sensor housing 110 made of synthetic resin will be fixed in a vehicle fuel tank 190. In a magnet chamber 110A formed in the sensor housing 110 is rotatably arranged a rotary shaft 120. On the outer circumference surface of the rotary shaft 120 is fitted a sintered magnet 130. The sintered magnet 130 is fixed to the rotary shaft 120 via fixing means such as bonding or engagement.

The sintered magnet 130 is for example a ferrite magnet formed by annularly molding magnetic powder and radially magnetizing the resulting mold of magnetic powder to the two poles. The sintered magnet 130 is hard and brittle and will suffer from cracks in the process of insert molding described later. Thus, a main body part formed via insert molding is fixed to the rotary shaft 120 via fixing means such as bonding or engagement as described earlier.

As shown in FIG. 7, to the opening in the magnet chamber 110A is fixed a magnet chamber cover 111 made of synthetic resin by engaging a claw 110B formed on the sensor housing 110 and an engaging hole 111A provided in the magnet chamber cover 111. Further, the magnet chamber cover 111 has a support hole 111B formed therein. In the support hole 111B is inserted and rotatably supported one end of the rotary shaft 120.

As shown in FIG. 5, the other end of a float arm 150 one end of which is attached to a float 140 is fitted to the hole in the rotary shaft 120 and is integrally fixed to the rotary shaft 120. When the float 140 moves up and down with variations in the liquid level L, the vertical movement is transmitted to the rotary shaft 120 via the float arm 150 to rotate the rotary shaft 120.

As shown in FIG. 6, a stator 160 is composed of a pair of pieces in the shape of a substantial semi-circle and is arranged to form a substantial circle while opposed to the outer circumferential surface of the sintered magnet 130. Between both end surfaces of the pair of stators 160 is formed two gaps G, G having a phase difference of 180°. In one gap G is arranged, for example, a magnetic-electric conversion element 170 such as a Hall element or a Hall IC while sandwiched by a pair of stators 160. The terminal 170A of the magnetic-electric conversion element 170 is electrically connected to a wiring plate 180 shown in FIG. 5. To the wiring plate 180 is electrically connected a terminal 180A.

When the float 140 moves up and down with variations in the liquid level L, the rotary shaft 120 rotates together with the sintered magnet 130. When the magnetic flux density passing through the magnetic-electric conversion element 170 varies with the rotation of the sintered magnet 130, the magnetic-electric conversion element 170 detects the variation in the magnetic flux density and converts the variation to an electric signal and outputs the same to the terminal 180A.

CITATION LIST

Patent Literature

[Patent Reference 1] JP-A-2004-37196

Figure 8:
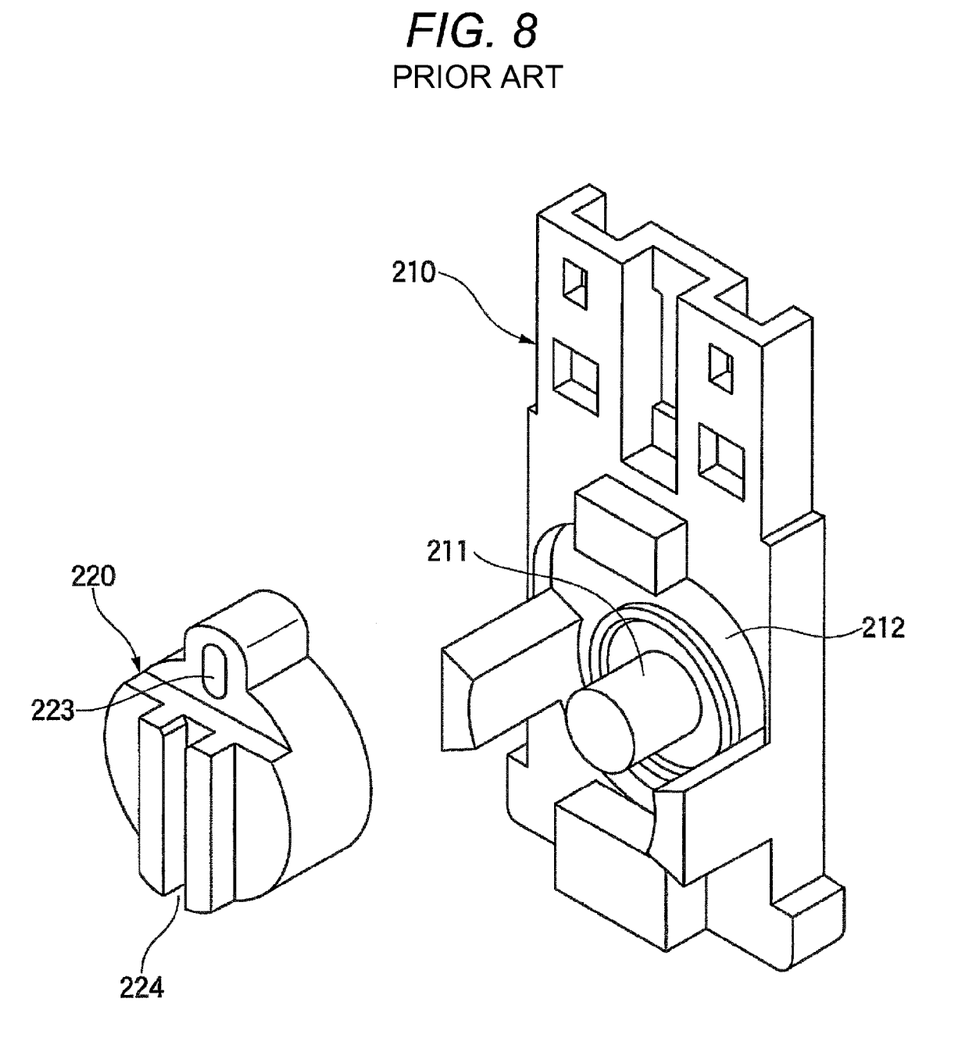
FIG. 8 is a perspective view of a key section showing a frame and a magnet holder extracted from the contactless liquid level sensor according to the related art.
Figure 9:
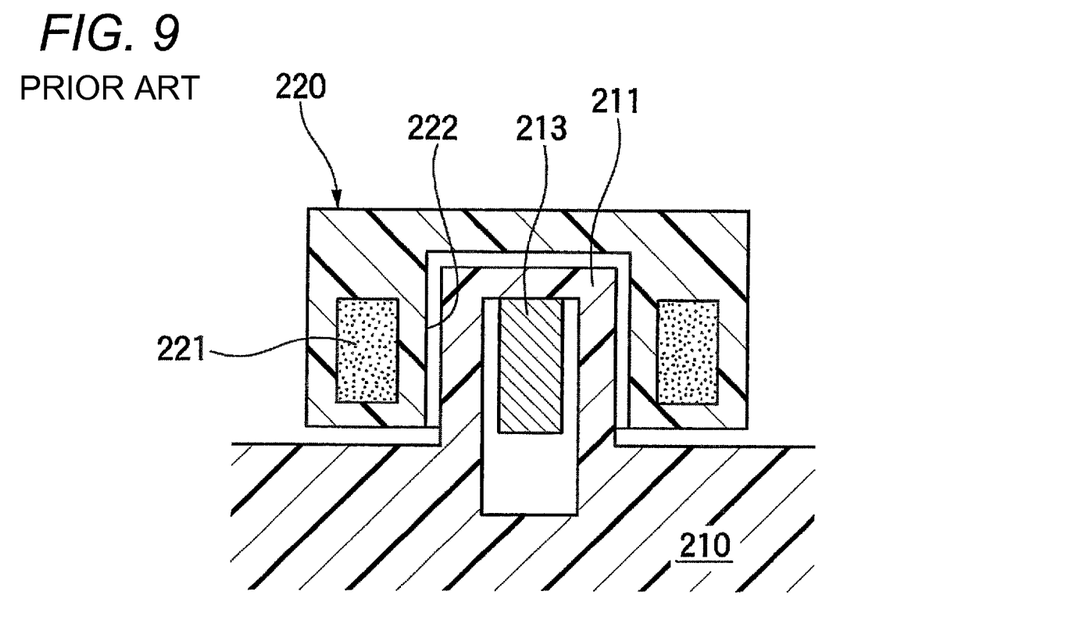
FIG. 9 is a cross-sectional view of a state where the fitting hole in the magnet holder is fitted to the central shaft of the frame on the related art contactless liquid level sensor shown in FIG. 8.
Figure 10:
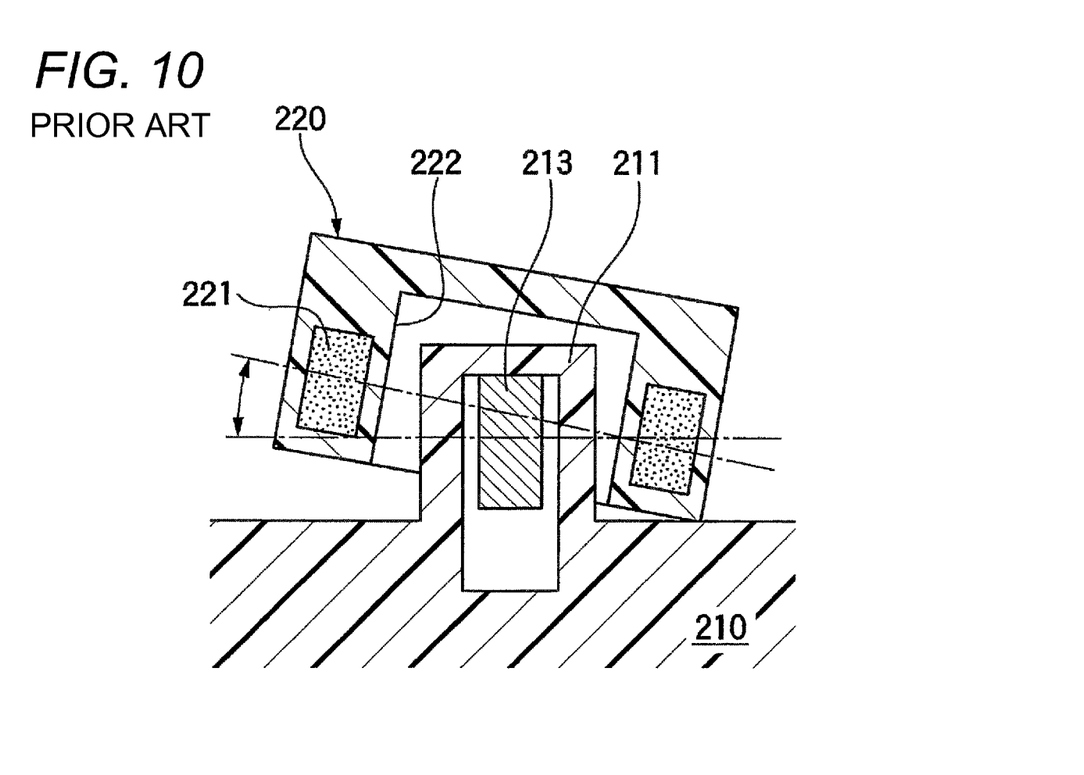
FIG. 10 is a cross-sectional view of the frame and the magnet holder showing the worn state of the sliding parts of the related art contactless liquid level sensor shown in FIG. 8.

In recent years, the contactless liquid level sensor described below has been developed. FIG. 8 is a perspective view of a key point showing a frame and a magnet holder extracted from the contactless liquid level sensor according to the related art. FIG. 9 is a cross-sectional view of a state where the fitting hole in the magnet holder is fitted to the central shaft of the frame. FIG. 10 is a cross-sectional view of the frame and the magnet holder showing the worn state of the sliding parts.

As shown in FIGS. 8 and 9, a frame 210 is made by injection-molding a synthetic resin. The frame 210 supports a magnet holder 220 in a rotatable state and thus concentrically arranges a central shaft 211 serving as the center of rotation and an erected circular wall 212. The central shaft 211 includes therein a magnetic-electric conversion element 213 such as an IC Hall element in order to detect the rotation amount of a magnet 221 accommodated in the magnet holder 220. When the magnetic flux density passing through the magnetic-electric conversion element 213 varies, the magnetic-electric conversion element 213 detects the variation in the magnetic flux density and converts the variation to an electric signal and outputs the same to outside.

The magnet holder 220 made of synthetic resin includes, in one surface, a central hole 222 formed in the center for rotatably supporting the central shaft 211 of the frame 210. The magnet 221 is accommodated to surround the periphery of the central hole 222. The magnet holder 220 includes an insertion hole 223 for inserting the other end of a float arm (not shown) one end of which is attached to the float and a holding groove 224 for holding the intermediate part of the float arm into which the float is attached via the float arm.

With such a contactless liquid level sensor, when the float moves up and down with variations in the liquid level, the vertical movement is transmitted to the magnet holder 220, which rotates about the central shaft 211. When the magnetic flux density passing through the magnetic-electric conversion element 213 varies, the magnetic-electric conversion element 213 detects the variation in the magnetic flux density and converts the variation to an electric signal and outputs the same to outside.

As shown in FIGS. 9 and 10, the magnet holder 220 rotates about the central shaft 211 with variations in the liquid level. In case both the frame 210 and the magnet holder 220 are made of resin, sliding between the outer circumferential surface of the central shaft 211 and the inner circumferential surface of the central hole 222 gradually progresses to generate a backlash in the fitting state between the frame 210 and the magnet holder 220. When the backlash in the fitting state between the frame 210 and the magnet holder 220 becomes excessive, as shown in FIG. 10, the magnet holder 220 could be inclined with respect to the central shaft 211. Thus, the positional relation between the magnetic-electric conversion element 213 accommodated in the central shaft 211 and the magnet 221 accommodated in the magnet holder 220 could be unstable, resulting in unstable output of an electric signal and reduced detection accuracy. In case both the frame 210 and the magnet holder 220 are made of the same resin, the resin could be welded due to friction heat in an extreme case.

SUMMARY OF INVENTION

The invention has been accomplished in view of the above circumstances. An object of the invention is to provide a contactless liquid level sensor capable of preventing a drop in the detection accuracy caused by wear of the central shaft of a frame where a magnet holder and the magnet are fitted to each other in the course of prolonged use.

In order to attain the above object, a contactless liquid level sensor according to the invention is configured by the followings (1) to (4):

(1) A contactless liquid level sensor, including: a magnet holder which includes a resin holder body having an inner circumferential surface for defining a fitting hole and a magnet accommodated inside the holder body along the inner circumferential surface; a resin frame including a frame body, a central shaft protruding from the frame body, and a magnetic-electric converter accommodated inside the central shaft; a float arm including one end fixed to the magnet holder and the other end attached to a float vertically moving in accordance with a liquid level; and a metallic rotary support including a hollow cylindrical part arranged between the inner circumferential surface of the holder body and an outer circumferential surface of the central shaft, wherein when the magnet holder rotates about the central shaft in accordance with the liquid level, a magnetic flux density passing through the magnetic-electric converter is varied thereby detecting a variation in the liquid level.

With the contactless liquid level sensor of the configuration (1), a fitting hole in the magnet holder made of a resin material and the central shaft of the frame made of a resin material are fitted to each other via a metallic rotary support. Direct contact of resin between a fitting hole and a central shaft is avoided and the central shaft and the fitting hole are slidable via a rotary support. This offers sliding by a contact between a metal and resin, which dramatically reduces the friction resistance compared with a case where resin-made fitting hole and central shaft are in direct sliding on each other. This suppresses wear of the fitting hole and the central shaft. This also stabilizes the relative position of the magnet holder with respect to the central shaft and maintains constant detection accuracy despite prolonged use.

(2) In the contactless liquid level sensor of the configuration (1), the rotary support further includes a locking part integrally formed at one end of the hollow cylindrical part, and the frame further includes an engaging part for engaging to the locking part so as to restrict relative rotation of the rotary support with respect to the central shaft.

With the contactless liquid level sensor of the configuration (2), the rotary support includes a locking part at one end and the locking part is engaged and fitted to an engaging part arranged on the frame. This restricts relative rotation of the rotary support with respect to the central shaft. The only sliding parts of the contactless liquid level sensor in operation are the rotary support and the fitting hole, which further suppresses possible wear. The influence of a gap between the central shaft and the rotary support on the position accuracy of the magnet holder is eliminated, thus further enhancing the detection accuracy.

(3) In the contactless liquid level sensor of the configuration (2), the locking part is a guard extending radially outward from the one end of the hollow cylindrical part.

With the contactless liquid level sensor of the configuration (3), it is possible to flexibly change the shape of the guard through piece division for a mold, thus setting a restriction angle for relative rotation of the rotary support with respect to the central shaft.

(4) In the contactless liquid level sensor of the configuration (2), the locking part includes one of a groove and a convex, and the engaging part includes the other of the groove and the convex to engage the groove with the convex in a radial direction of the central shaft.

With the contactless liquid level sensor of the configuration (4), it is possible to further restrict the relative rotation of the rotary support with respect to the central shaft.

With the contactless liquid level sensor according to the invention, the central shaft is inserted into the fitting hole in the magnet holder via a rotary support. The resin material of the fitting hole and the resin material of the central shaft slide and rotate via the rotary support without direct contact therebetween, which suppresses wear of the fitting hole and the central shaft. This prevents the magnet holder from being inclined with respect to the central shaft to maintain stable positional relation and constantly keep certain detection accuracy.

DESCRIPTION OF EMBODIMENTS

A preferable embodiment according to the invention will be detailed based on the accompanying drawings.

Figure 1:
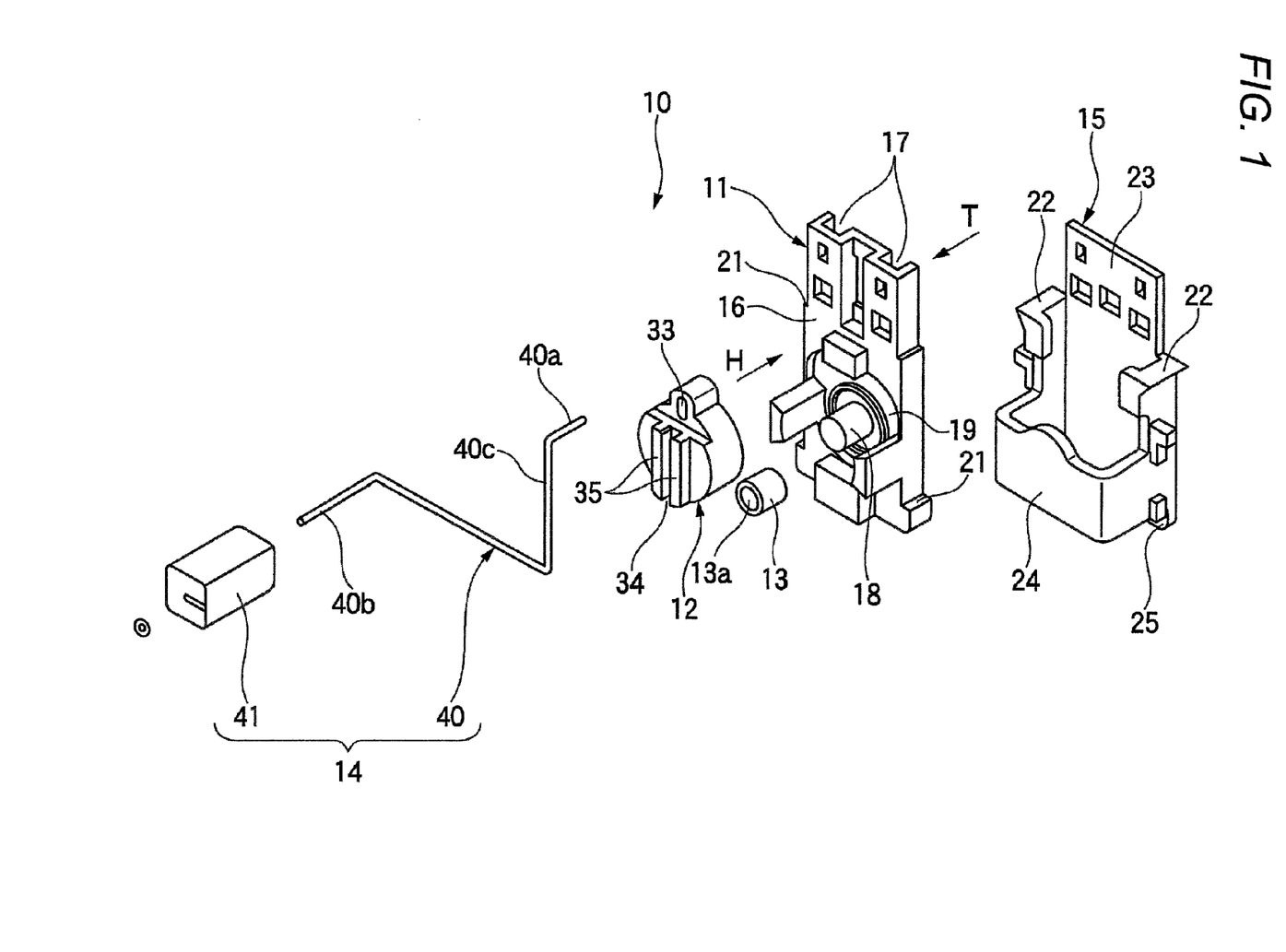
FIG. 1 is an exploded perspective view of a contactless liquid level sensor according to an embodiment of the invention.
Figure 2:
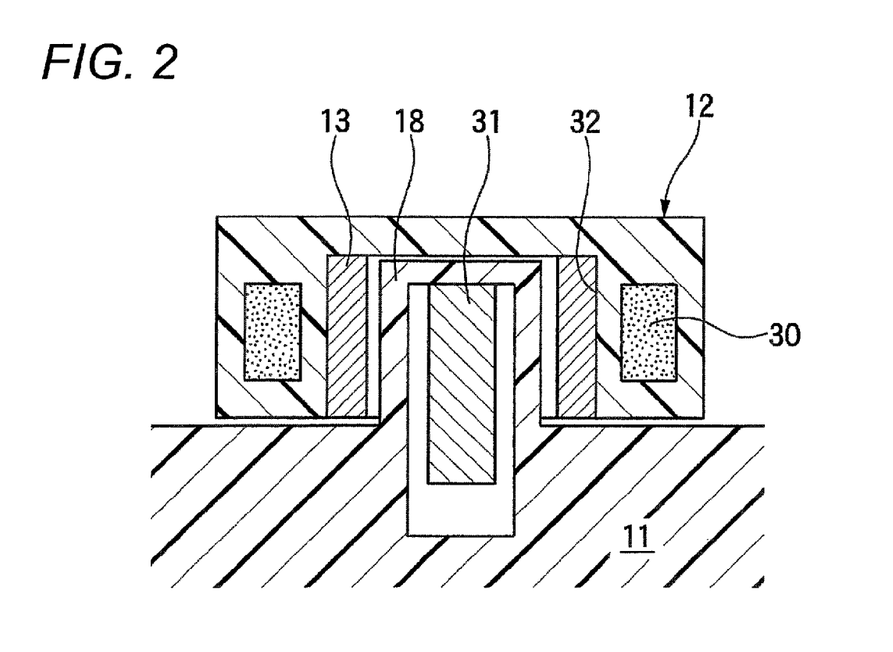
FIG. 2 is a cross-sectional view of the attaching state of the central shaft of a frame and a rotary support to the fitting hole in a magnet holder shown in FIG. 1.

FIG. 1 is an exploded perspective view of a contactless liquid level sensor according to an embodiment of the invention. FIG. 2 is a cross-sectional view of the attaching state of the central shaft of a frame and a rotary support to the fitting hole in a magnet holder shown in FIG. 1.

As shown in FIG. 1, a contactless liquid level sensor 10 according to this embodiment is designed to detect the liquid level of a liquid such as gasoline and includes a frame 11, a magnet holder 12, a rotary support 13, a float part 14, and a cover 15.

The frame 11 according to this embodiment is formed by a general molding method such as injection molding by using an appropriate resin material such as POM or PPS. The frame 11 includes a frame body 16 formed into a thin box shape. One surface (rear surface on the T side) of the frame body 16 has an opening to form a pair of lead chambers 17 (right and left). In the lead chamber 17 is accommodated a lead frame assembly to which electronic components are connected. Electronic components welded to the lead frame assembly are shielded by resin. This construction avoids possible damage to an electronic component while the cover 15 is in contact with the electronic component in an attempt to mount the cover 15 on the frame 11.

On the frame 11 according to this embodiment, a central shaft 18 as the center of rotation and an erected circular wall 19 are concentrically arranged below the center of an opposite surface (hereinafter referred to as the "surface H"). This arrangement rotatably supports the magnet holder 12 via the rotary support 13.

As shown in FIG. 2, the central shaft 18 includes therein a magnetic-electric conversion element (magnetic-electric converter) 31 such as an IC sensor in order to detect the rotation amount of the magnet 30 accommodated in the magnet holder 12. When the magnetic flux density passing through the magnetic-electric conversion element 31 varies, the magnetic-electric conversion element 31 detects the variation in the magnetic flux density and converts the variation to an electric signal and outputs the same to outside.

The frame 11 has a step height 21 formed thereon. A claw 25 is arranged at the lower end of the cover 15. When the cover 15 is fitted outside the frame 11 lengthwise, the claw 25 on the cover 15 is engaged to the step height 21 and the cover 15 is assembled to the frame 11.

The magnet holder 12 is formed by insert-molding the magnet 30 by using an appropriate resin material such as POM or PPS. The center of the magnet holder 12 (holder body) has a fitting hole 32 formed therein for arranging the rotary support 13. Inside the outer circumference of the fitting hole 32 is integrally accommodated the cylindrical magnet 30. The magnet holder 12 is rotatably supported while the fitting hole 32 is being inserted through the central shaft 18 of the frame 11 via the rotary support 13.

The magnet 30 according to this embodiment is a ferrite magnet or the like formed into a cylindrical shape with an appropriate magnetic material. While the magnet 30 may be insert-molded into the magnet holder 12 as described above, alternatively the magnet 30 may be press-fitted into a magnet-receiving chamber formed in the magnet holder 12. Alternatively, the magnet 30 may be inserted into the magnet-receiving chamber and then bonded and fixed thereto.

The magnet holder 12 includes, in the front surface H, an insertion hole 33 for inserting one end 40a of a float arm 40 described later and includes, on the outer circumferential surface in the center of the magnet holder 12, a holding groove 34 for holding a held part 40c of an intermediate part of the float arm 40.

The insertion hole 33 is a hole pierced in the direction from the magnet holder 12 to the frame 11 assumed in case the magnet holder 12 is rotatably supported by the central shaft 18. The insertion hole 33 is pierced in a direction parallel to the direction the magnet holder 12 is attached to the central shaft 18. The holding groove 34 is formed by two protruding strips 35 extending in a direction orthogonal to the direction of the insertion hole 33 pierced into the magnet holder 12 in order to hold the held part 40c coupled orthogonally to one end 40a of the float arm 40 inserted into the insertion hole 33.

The rotary support 13 has a shape of a hollow cylinder formed in a ring shape with a metal such as stainless steel or brass (in FIG. 1, the hollow cylindrical part of the rotary support 13 is denoted as 13a). The rotary support 13 is arranged between the inner circumferential surface defining the fitting hole 32 in the magnet holder 12 and the outer circumferential surface of the central shaft 18 of the frame 11. That is, the fitting hole 32 in the magnet holder 12 is inserted through the central shaft 18 of the frame 11 via the rotary support 13 to cause the central shaft 18 to rotatably support the magnet holder 12.

The float part 14 includes a float arm 40 one end 40a of which is fitted to the insertion hole 33 in the magnet holder 12, and a float 41 rotatably mounted on the other end 40b of the float arm 40.

The cover 15 is mounted on the frame 11 from above the frame 11 to which the magnet holder 12 is assembled in a rotatable fashion and is fixed thereto via a claw together with the lead frame assembly.

The cover 15 has a hollow, substantially box shape and includes a flat base plate 23, a hollow, substantially box-shaped enclosing part 24, a holding part 22 for holding both side surfaces of the frame 11 from both front and rear surfaces, and a claw 25 arranged inside both sides of a lower end of the enclosing part 24 and is fixed to the step height 21 of the frame 11 with the claw 25. In this way, the cover 15 is fitted outside the frame 11. The magnet holder 12 and the float arm 40 supported by the frame 11 are retained by the cover 15.

When the float 41 moves up and down in accordance with the liquid level, the magnet holder 12 rotates about the central shaft 18 of the frame 11 together with the magnet 30. When the magnetic flux density passing through the magnetic-electric conversion element 31 arranged in the central shaft 18 varies with the rotation of the magnet 30 accommodated in the magnet holder 12, the magnetic-electric conversion element 31 detects the variation in the magnetic flux density and converts the variation to an electric signal and outputs the same to outside. In this way, the rotation amount of the magnet 30, that is, a variation in the liquid level is detected.

As described above, the fitting hole 32 in the magnet holder 12 is inserted via the metallic rotary support 13 having a smooth surface with small friction resistance. This suppresses possible wear of the central shaft 18 and the fitting hole 32 and maintains the support state with reduced backlash for a prolonged period. Thus, the relative positions of the magnetic-electric conversion element 31 arranged in the central shaft 18 and the magnet 30 accommodated in the magnet holder 12 is constantly stable. A stable detection signal is received from the magnetic-electric conversion element 31 thus allowing detection with high accuracy.

Figure 3:
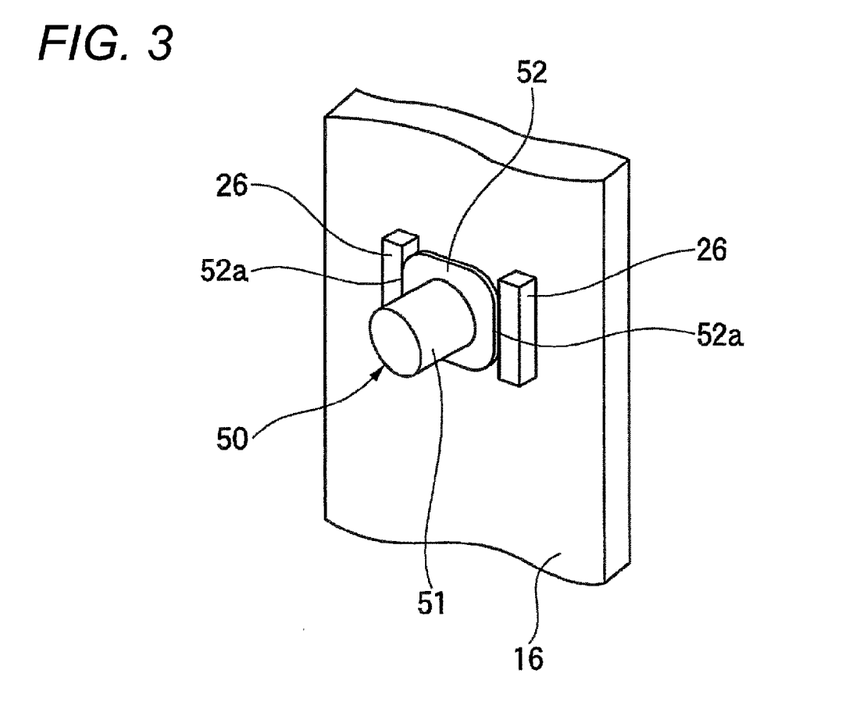
FIG. 3 is a perspective view of a key point showing the state in which the rotary support according to a variant is mounted on the central shaft of the frame.
Figure 4:
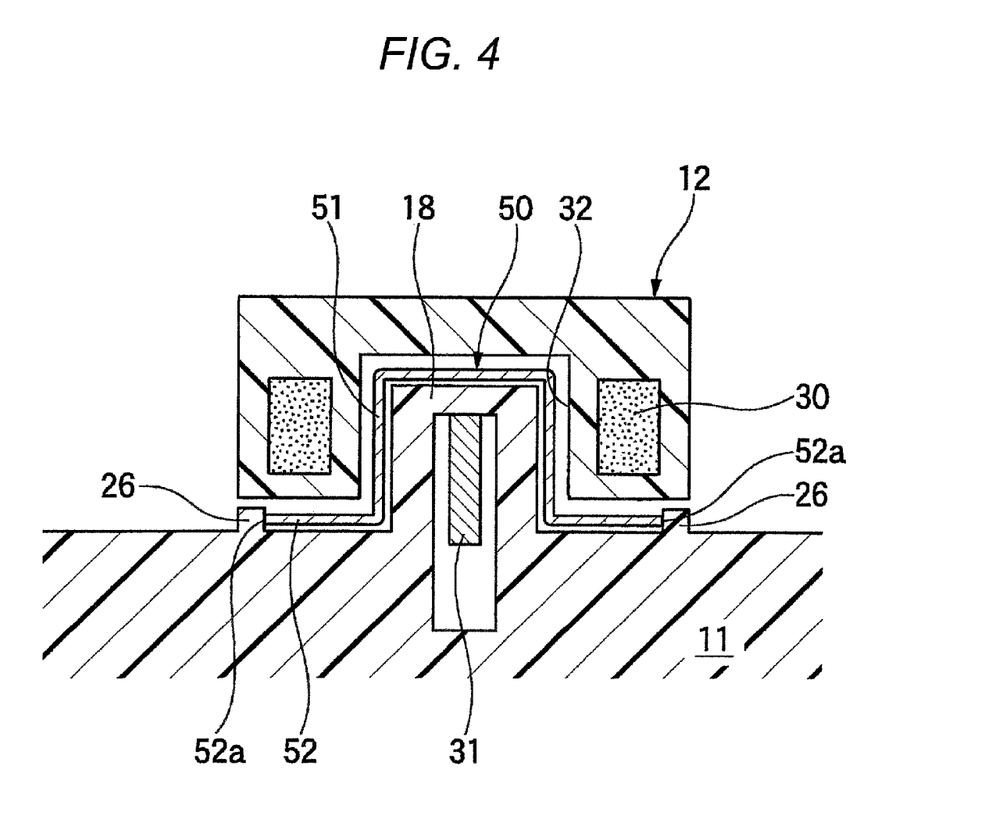
FIG. 4 is a cross-sectional view of the attaching state of the central shaft of a frame, a rotary support and the fitting hole in a magnet holder shown in FIG. 3.

Next, a variant of this embodiment will be described referring to FIGS. 3 and 4. FIG. 3 is a perspective view of a key section showing the state in which the rotary support according to a variant is mounted on the central shaft of the frame. FIG. 4 is a cross-sectional view of the attaching state of the central shaft of a frame, a rotary support and the fitting hole in a magnet holder shown in FIG. 3.

A contactless liquid level sensor according to the variant is the same as that of the invention except that the shape of a rotary support is mainly different. The same part is given the same sign or an equivalent sign and corresponding description is simplified or omitted for the sake of brevity.

As shown in FIGS. 3 and 4, a rotary support 50 according to the variant includes a bottomed rotary support body 51 formed by stainless steel or brass and a guard 52 formed radially outward from one end of the rotary support body 51. At each of the right and left ends of the guard 52 in FIGS. 3 and 4 is formed a straight line part 52a.

On the frame 11 is formed a central shaft 18 including therein a magnetic-electric conversion element 31 while protruding from the frame body 16. On both sides of the central shaft 18 is formed a pair of ribs 26 protruding from the frame body 16. The rotary support 50 is mounted on the frame 11 with the rotary support body 51 inserted through the central shaft 18 and the straight line part 52a of the guard 52 held by the pair of ribs 26 in the state where rotation with respect to the central shaft 18 is restricted.

In this way, the rotary support 50 fixed to the frame 11 while its rotation with respect to the central shaft 18 is restricted by the straight line part 52a of the guard 52 and the pair of ribs 26 rotatably supports the magnet holder 12 according to the embodiment described referring to FIG. 1.

With the contactless liquid level sensor according to this variant, the only sliding parts of the contactless liquid level sensor under rotation of the magnet holder 12 are the fitting hole 32 in the magnet holder 12 and the outer circumferential surface of the rotary support body 51 of the rotary support 50, resin materials do not slide on each other, which suppresses possible wear. A gap between the central shaft 18 and the rotary support body 51 does not influence on the position accuracy of the magnet holder 12 thus further enhancing the detection accuracy. Division of pieces for a mold flexibly changes the shape of the guard. Thus, it is possible to set the restricted angle of relative rotation of a rotary support with respect to the central shaft.

As described above, with the contactless liquid level sensor 10 according to this embodiment of the invention, the fitting hole 32 in the magnet holder 12 is supported by the central shaft 18 via the rotary support 13 thus avoiding sliding of resin materials on each other and suppressing wear of the fitting hole 32 and the central shaft 18. Thus, it is possible to prevent inclination of the magnet holder 12 with respect to the central shaft 18 as shown in FIG. 10 and maintain stable positional relation and constantly keep certain detection accuracy.

The rotary support is made of a metal having a smooth surface with reduced friction. The resulting sliding parts are a combination of resin and metal, which reduces friction resistance compared with a case where resin materials slide on each other. This reduces wear of the sliding parts and provides stable relative position of the magnet holder 12 with respect to the central shaft 18 and constantly keeps certain detection accuracy in the course of prolonged use.

Further, the rotary support 50 includes the guard 52 at one end thereof. The guard 52 is engaged to the ribs 26 arranged on the frame 11 to restrict relative rotation with respect to the central shaft 18, the only sliding parts are the outer circumferential surface of the rotary support body 51 and the fitting hole 32 in the magnet holder 12, thus further suppressing possible wear. The influence of a gap between the central shaft 18 and the inner circumferential surface of the rotary support body 51 on the position accuracy of the magnet holder 12 is eliminated, thus further enhancing the detection accuracy.

The invention is not limited to the foregoing embodiment and variant and may be modified or improved as required. The material, shape, dimensions, numeric values, form, number, location and the like of each component in the foregoing embodiment and variant are arbitrary and not limited as long as the invention is attained.

While the central shaft 18 protruding from the frame 11 is inserted through the fitting hole 32 in the magnet holder 12 in the above embodiment, the invention is not limited thereto. Alternatively, the invention is also applicable to a case where the fitting of the frame and the magnet holder is inverse, that is, a contactless liquid level sensor where the central shaft of a magnet holder is inserted through a fitting hole formed in a frame. In this case, the rotary support described in the above embodiment is inserted through by the central shaft of the magnet holder and is inserted through the fitting hole formed in the frame. The rotary support 50 with a guard described in the variant is inserted through by the central shaft of the magnet holder and is inserted through the fitting hole formed in the frame while rotation of the rotary support 50 is restricted with the guard held by the ribs arranged on the magnet holder.

While the guard of the rotary support is held by the ribs to restrict rotation of the rotary support in the variant, the invention is not limited thereto but the rotary support may take any form as long as rotation of the rotary support can be restricted with respect to the frame. For example, a convex part formed on the frame may be engaged to a groove arranged in radial direction at the end of an annular rotary support so as to restrict rotation of the rotary support.

This application is based upon and claims the benefit of priority of Japanese Patent Application No. 2008-106860 filed on Apr. 16, 2008, the contents of which are incorporated herein by reference in its entirety.

Industrial Applicability

The present invention is to prevent a drop in the detection accuracy caused by wear of the central shaft of a frame where a magnet holder and the magnet are fitted to each other in the course of prolonged use, and is useful for level-sensing the varied liquid level of a liquid such as a fuel in a vehicle.

The invention claimed is:

1. A contactless liquid level sensor, comprising:
   a magnet holder which includes a resin holder body having an inner circumferential surface for defining a fitting hole and a magnet accommodated inside the holder body along the inner circumferential surface;
   a resin frame including a frame body, a central shaft protruding from the frame body, and a magnetic-electric converter accommodated inside the central shaft;
   a float arm including one end fixed to the magnet holder and the other end attached to a float vertically moving in accordance with a liquid level; and
   a metallic rotary support including a hollow cylindrical part arranged between the inner circumferential surface of the holder body and an outer circumferential surface of the central shaft,
   wherein when the magnet holder rotates about the central shaft in accordance with the liquid level, a magnetic flux density passing through the magnetic-electric converter is varied thereby detecting a variation in the liquid level,
   wherein the rotary support further includes a locking part integrally formed at one end of the hollow cylindrical part, and
   wherein the frame further includes engaging part for engaging to the locking part so as to restrict elative rotation of the rotary support with respect to the central shaft.

2. The contactless liquid level sensor according to claim 1, wherein the locking part is a guard extending radially outward from the one end of the hollow cylindrical part.

3. The contactless liquid level sensor according to claim 1, wherein the locking part includes one of a groove and a convex, and the engaging part includes the other of the groove and the convex to engage the groove with the convex in a radial direction of the central shaft.

* * * * *